US010796014B2

(12) United States Patent
Milman et al.

(10) Patent No.: US 10,796,014 B2
(45) Date of Patent: Oct. 6, 2020

(54) DATA LICENSE MANAGER

(71) Applicant: International Business Machines Corporation, Armonk, NY (US)

(72) Inventors: Ivan Matthew Milman, Austin, TX (US); Martin Oberhofer, Bondorf (DE); Sushain Pandit, Austin, TX (US); Charles Daniel Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 15/855,814

(22) Filed: Dec. 27, 2017

(65) Prior Publication Data

US 2019/0197250 A1    Jun. 27, 2019

(51) Int. Cl.
*G06F 17/00*   (2019.01)
*G06F 21/62*   (2013.01)
*G06F 16/25*   (2019.01)
*G06F 21/10*   (2013.01)

(52) U.S. Cl.
CPC ........ *G06F 21/6218* (2013.01); *G06F 16/254* (2019.01); *G06F 21/10* (2013.01); *G06Q 2220/18* (2013.01)

(58) Field of Classification Search
CPC ..... G06F 16/254; G06F 21/10; G06F 21/6218
See application file for complete search history.

(56) References Cited

U.S. PATENT DOCUMENTS 8,341,195 B1 * 12/2012 Cole ............... G06Q 30/02
                                                              705/51
8,590,052 B2    11/2013 Kruger
2008/0228578 A1 *  9/2008 Mashinsky ........ G06F 21/10
                                                              705/14.54
2009/0271318 A1   10/2009 Grobler
2011/0264688 A1   10/2011 Dettinger et al.
2015/0254439 A1    9/2015 Ao
2016/0085861 A1    3/2016 Večeřa
2017/0005967 A1    1/2017 Simpson

OTHER PUBLICATIONS http://learn.flexerasoftware.com/PPC-SLO-WBNR-Software-Asset-Management-Series?utm_source=Google&utm_medium=cpc&utm_campaign=SLO-NA-Top-Pos&utm_term=license%20management%20software&utm_matchtype=e&gclid=CjwKEAiAjvrBBRDxm_nRusW3q1QSJAAzRl1tZ47vanGB7K6f6QSfqWChhU1aqM5Keqa B3nRFBVImMRoChK3w_wcB.

* cited by examiner

*Primary Examiner* — Truong V Vo

(74) *Attorney, Agent, or Firm* — Robert C. Bunker

(57) ABSTRACT

A system and method for managing and controlling data licenses for information assets. An information asset is stored in a repository, and registered in a catalog for the repository. A data license is associated with the information asset in the catalog, wherein the data license is stored as part of the information asset's metadata in the catalog. Access to the information asset stored in the repository is controlled based on the data license. A new data license is automatically created for a new information asset derived from an existing information asset, wherein the new data license is derived from an existing data license for the existing information asset. A lineage graph of the information asset is automatically created for audit purposes, to show that the information asset has been accessed in compliance with the data license.

18 Claims, 7 Drawing Sheets

| SCOPE MATRIX 316 | RE-LICENSE IN PARTS 318 | RE-SELL IN PARTS 320 |
|---|---|---|
| BALANCE 302 | N | N |
| BRANCH 304 | Y | Y |
| HOLDER ID 306 | N | N |
| ACCOUNT ID 308 | N | N |
| *** | *** | *** |

| DATA LICENSE 310 |
|---|
| DATA LICENSE ID 312 |
| DATA LICENSE OWNER 312 |
| MUST CREDIT OWNER 314 |
| *** |
| SCOPE MATRIX 316 |

| BANK CHECKING TABLE 300 |
|---|
| BALANCE 302 |
| BRANCH 304 |
| HOLDER ID 306 |
| ACCOUNT ID 308 |
| *** |

FIG. 3

DATA LICENSE MANAGER

BACKGROUND

Information assets often include data licenses with different usage constraints. It is often difficult to manage and enforce data licenses with different usage constraints to ensure data is processed at all times in compliance according to the usage constraints. It is also difficult to ensure that data derived under the data licenses conform to the same usage constraints.

Thus, there is a need in the art for improvements to managing and controlling data licenses for information assets. The present invention satisfies this need.

SUMMARY

The invention provided herein has a number of embodiments useful, for example, in a system and method for managing and controlling data licenses for information assets.

The system and method store an information asset in a repository, and then register the information asset in a catalog for the repository. A data license is associated with the information asset in the catalog, wherein the data license is stored as part of the information asset's metadata in the catalog.

The system and method control access to the information asset stored in the repository based on the data license, by allowing a user to access the information asset only when the data license permits such access and the user has a proper entitlement under the data license to access the information asset. In addition, an alert is generated if the user tries to access the information asset for which the user does not have the proper entitlement under the data license; the user is allowed to add the proper entitlement to their account if needed; and additional checkouts of the information asset are prevented once a maximum number of users permitted for the information asset under the data license is reached, until at least one of the users returns the information asset or additional license coverage becomes available.

The system and method also automatically create a new data license for a new information asset derived from an existing information asset, wherein the new data license is derived from an existing data license.

In addition, the system and method automatically create a lineage graph of the information asset for audit purposes, providing proof that the information asset has been accessed in compliance with the data license. The lineage graph may be used to determine whether there is a need for a new data license derived from the existing data license for a new information asset derived from the existing information asset. In this regard, the lineage graph may be used to determine whether the information asset bound by the data license has been only used for lookup or validation operations, and hence no new information asset has been created from the information asset requiring a new data license.

BRIEF DESCRIPTION OF THE DRAWINGS

Referring now to the drawings in which like reference numbers represent corresponding parts throughout:

FIG. 3 illustrates how a data license is bound to metadata in for an information asset.

DETAILED DESCRIPTION

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Overview

This disclosure describes a method and system for licensing and managing data in a distributed computing environment. Specifically, this disclosure affects data processing, where data with different usage licenses are processed. This disclosure proposes a mechanism to manage and enforce data usage licenses to ensure data is processed at all times in compliance according to the license constraints. This disclosure is of particular value for data and insight services providers, analytics providers, etc.

Data Lake System

Figure 1:
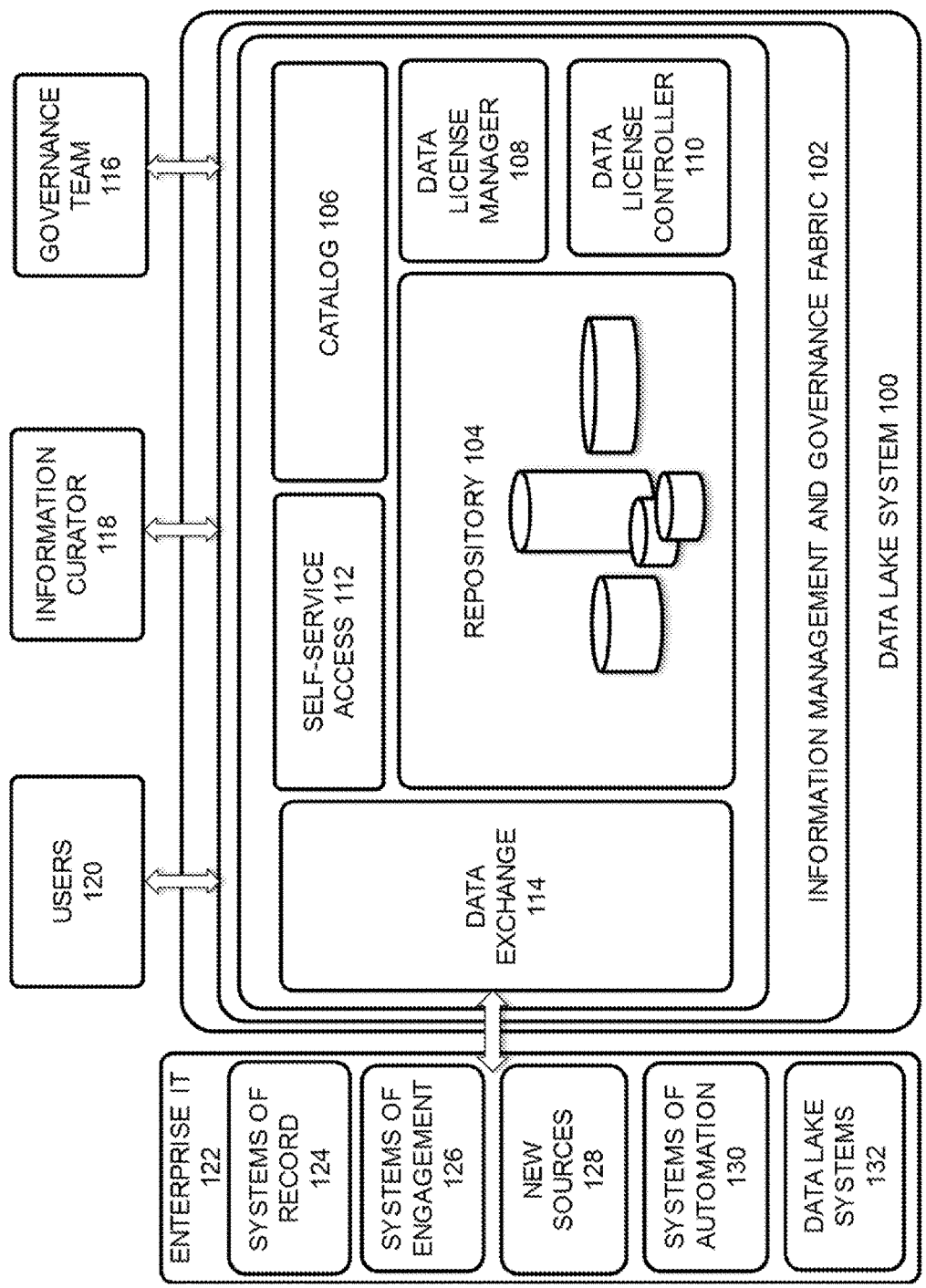
FIG. 1 illustrates a hardware and software environment for an enterprise information architecture space.

FIG. 1 illustrates a hardware and software environment for this disclosure, which is an enterprise information architecture space known as a Data Lake system 100. The Data Lake system 100 is comprised of an Information Management and Governance Fabric 102, which includes at least one Repository 104, Catalog 106, Data License Manager 108, Data License Controller 110, Self-Service Access 112, and Data Exchange 114. The Data Lake system 100 is managed by a Governance Team 116, information assets stored in the Data Lake system 100 are overseen by an Information Curator 118, and the Data Lake system 100 is used by one or more business or data analytics users 120.

In one embodiment, the components of the Data Lake system 100 may be maintained on-premises, in the cloud, or any combination thereof.

One component comprises unregistered information assets from an Enterprise Information Technology (IT) 122 realm. This group represents any system holding data, which may be Systems of Record 124 comprising an on-line transaction processing (OLTP) type system such as an enterprise resource planning (ERP) system or an analytical system such as a data mart; Systems of Engagement 126 such as a mobile channel for customers; New Sources 128; Systems of Automation 130; as well as other Data Lake systems 132. These information assets have in common that they are not governed by the Governance team 116 (yet).

Another component comprises the Repository 104 of the Data Lake system 100 itself. This component contains information assets that have been registered in the Data Lake system 100 through a registration process and are controlled by the Governance team 116. As part of the registration process, the Information Curator 118 may have cleansed data issues before allowing the information asset to be transferred into the Repository 104.

The registration process has a number of critical tasks. First, the information asset is registered in the Catalog 106. This means the name of the information asset, its logical and physical data model (metadata), etc., are captured in the Catalog 106 and in the Repository 104 where this information asset will be stored.

Second, the information asset undergoes a review by the Information Curator 118, who assesses the data quality and other relevant key performance indicators (KPIs) of the information asset. If necessary, the Information Curator 118 fixes issues before the information asset is stored in the Repository 104.

Third, any information asset in the Repository 104 has to be described regarding its business purpose, which usually comprises business terms captured alongside the technical metadata in the Catalog 106.

Fourth, any information asset in the Repository 104 must adhere to Information Governance policies as deemed necessary by the Governance Team 116. This means policies controlling security, data retention, data quality and other dimensions of Information Governance and appropriate governance rules are associated with the business terms and technical metadata assets as needed in the Catalog 106 by the Governance Team 116. Executable rules measure compliance with the policies and dashboards show the Governance Team 116 if all information assets remain in acceptable condition from an Information Governance perspective.

Fifth, if the information asset is regularly updated from sources or consumed, a data lineage needs to be created and maintained.

Sixth, once the registration is successfully completed, meaning the information asset is now available as fully described asset, it is made available in the list of consumable information assets.

Example of such Repositories 104 are shared operational data repositories managing, for example, reference data, master data or analytical systems, such as Hadoop™ distributed computing systems, data warehouses and data marts (data-at-rest analytics) or InfoSphere Streams™ (data-in-motion analytics).

The Catalog 106 maintains all metadata (business, technical and operational metadata) for all information assets processed in the Repository 104. It is used by many other parts of the Information Management and Governance Fabric 102, where tools like data profiling, information integration, etc., which capture and enrich metadata, contribute to its content as well as members of the Governance Team 116.

The Data Exchange 114 is comprised of capabilities such as information integration, e.g., Extract-Transform-Load (ETL), data replication, streaming, etc., to move data into the Repository 104 or extract them from the Repository 104, as needed in a fully governed manner, e.g., with data lineage, enforcing security with masking where needed, improving data quality, etc.

Self-Service Access 112 is used by business or data analytics uses 120. For example, data analytics users 120 use the Catalog 106 for information assets that are needed to execute their analytic processing. This component also includes capabilities such as Data Click™, where a data scientist can provision new Hadoop™ instances, data marts, etc., including the data transfer to them with a few mouse clicks and not needing any ETL developers. The same applies for business users 120 who need new analytic results and reports.

Information Assets

Insights derived from information assets are considered a key aspect to business success. Companies with a desire to strive in this data-centric economy not only want to process their own information assets to derive insights, but also want to aggregate information assets from other sources into the analytics process. This means that a Repository 104 may have:

1. Information assets created and owned by a company; and

2. Information assets acquired from third party sources.

With regard to the first category of information assets created and owned by the company, these fall into different categories.

A first category comprises information assets the company can freely use. For this category, a company can create its own data license for the information asset, declaring who can access and use the information asset for free, for a certain cost, if the information asset is permitted for further distribution, etc. These information assets can be sold, traded, etc. as the company sees fit.

A second category comprises information assets the company can use under constraints, such as customer information, which is regulated in many countries where companies are not permitted to share customer information either within business units within the company (e.g., Canada) or across company borders without explicit consent from the customer which the company needs to track. For these information assets, a company is not permitted to create data licenses for sale; instead, the company can only create a data license in accordance within the boundaries of the law in the respective countries.

Other constraints on the processing and sharing of information might be the data privacy promises a company makes to current or potential customers, for example, the data privacy policies of www.weather.com.

In addition, with regard to information assets acquired from third party sources, these may be information assets that are free to use by everyone, such as open data assets from the city of New York at www.data.cityofnewyork.us.

Another type of information assets in this category are information assets that are made available with a license, such as the Twitter™ developer license found at www.twitter.com. The use of such data is possible by adhering to certain license conditions. For example, the geospatial information which is part of the Twitter™ metadata is not permitted to be collected and shared or used outside of analyzing a Tweet™ itself.

Figure 2:
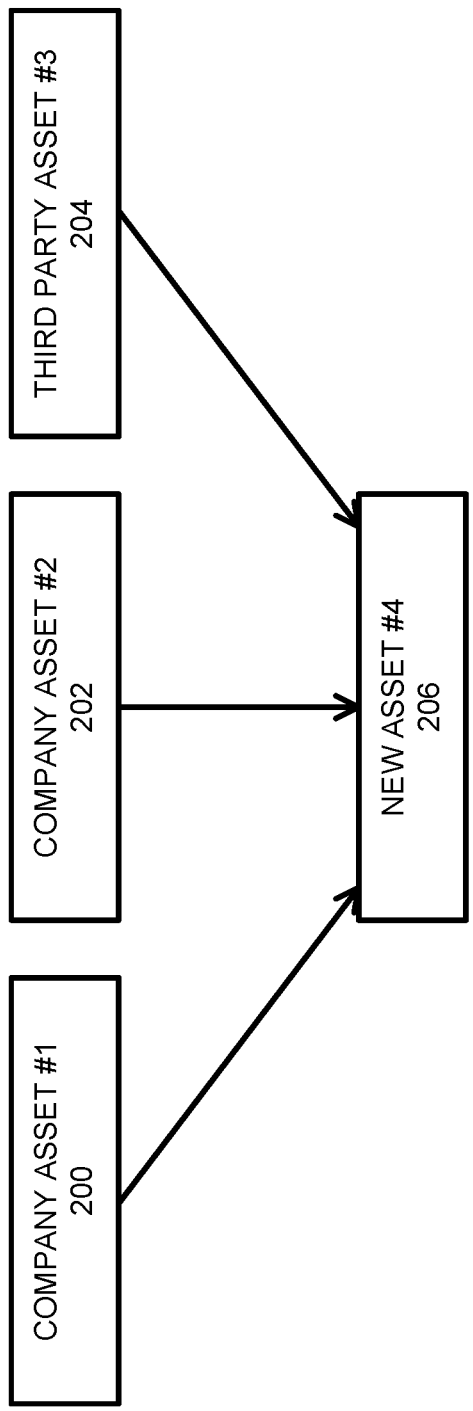
FIG. 2 illustrates the creation of a new information asset under the constraint of a data license.

FIG. 2 illustrates the creation of a new information asset under the constraint of a data license. In this example, assume that there is an information asset known as Company Asset #1 200. This is an information asset containing information the company owns and which is not regulated. A data license associated with this information asset may include the following terms:

Non-confidential.

Free to use for everyone inside the company.

Can be sold for $1,000.00 per copy.

A buyer does not get the right to redistribute or publish the information assets in parts or full in any form.

A buyer has the right to use it for analytical purposes.

Assume that there is also an information asset known as Company Asset #2 202. This is an information asset containing information the company owns; however, it is regulated customer information. A data license associated with this information asset may include the following terms:

The data is regulated and confidential depending on country.

In the USA:
  Customer information related to name, address and age is non-confidential.
    This part of the customer information is accessible to anyone within the enterprise.
    This information can be sold for $200,000.00 per 100,000 customer records.
    The buyer can use the information in any shape or form except for publishing it to the general public. The buyer can re-sell the information.
  Customer information related to credit card details is confidential.
    This part of the customer information is confidential and only accessible for employees with a need to know.
    This part of the customer information needs to be stored in encrypted with monitoring on access enabled.
    This part of the customer information cannot be sold externally.
In Canada:
  Customer information cannot be shared across business units internally unless the customer has provided written consent to do so.
  Customer information like credit card details must be stored encrypted and should be accessible only with a need to know.
  Canadian customer information can never be sold to other companies.
In Germany:
  Customer information is only to be used in the business context it was provided for.
  Customer information needs to be properly protected.
  Customer information cannot be sold to other companies.

Assume that there is another information asset known as Third Party Asset #3 204, which is from a third party. A data license associated with this information asset may include the following terms:
  The information asset can be redistributed in any shape or form as long as the creator of the information asset named John Smith is given proper credit for the information asset.
  The distributor of this information asset is not permitted to charge for the use of this information asset; instead, it has to remain free.

Now assume that, through the same data integration or analytical process, a new information asset known as New Asset #4 206 is derived using the three information assets 200, 202, 204 as input. A number of issues arise with New Asset #4 206 including the following: there is no description language for a data license that is understood by the systems; there is no computing of the data licenses for the new information assets based on the data licenses of the information assets used to derive the new information asset; and there is no monitoring whether access to the information assets is performed in compliance with their data license, e.g., did the user provide a valid license coverage?

This disclosure provides a number of functions to address these issues. Specifically, the Catalog 106 is extended to include data licenses as part of the metadata of an information asset, the Data License Manager 108 manages the data licenses, and the Data Controller 110 controls access to the information assets in the Repository 104 based on the data licenses.

For example, the Data License Manager 108 provides for data licenses to be created in the Catalog for information assets stored in the Repository 104. The Data License Manager 108 may automatically create data licenses for newly created information assets in the Catalog 106, based on the data licenses of the information assets from which newly created information assets were derived. The Data License Manager 108 may also create lineage graphs of the data licenses for newly created information assets. Moreover, the Data License Manager 108 allows the user 120 to add entitlements to their account if needed to prove a data license is in place.

In another example, the Data License Controller 110 allows users 120 to access information assets in the Repository 104 only when a corresponding data license in the Catalog 106 permits such access. Users 120 have the ability to provide evidence that they have proper entitlement (e.g., a key or something similar) to use the data license. The Data License Controller 110 may generate an alert if a user 120 tries to access an information assets for which the user 120 does not have proper data license entitlements. The Data License Controller 110 also prevents additional checkouts once the maximum number of users permitted for an information asset is reached as per the data license, until at least one user returns the information asset or additional license coverage becomes available.

There are a number of benefits that result from these functions. The Data License Controller 110 provides the ability to track proper usage of information assets based on data licenses. The Data License Controller 110 also avoids distribution of information assets if its data license does not allow the distribution. In addition, the Data License Manager 108 provides the ability to create new information assets with a proper data license. Finally, the Data License Manager 108 provides the ability to prove to auditors that all information assets have been processed in compliance with their data licenses.

The Data License Manager 108 and Data License Controller 110 rely upon a data license description language (DLDL) as a schema for data licenses for information assets. One possible embodiment of a data license includes the following attributes:
  Data license id: a unique number.
  Data license owner: a string identifying the data owner.
  Must credit owner: a flag indicated yes or no.
  Usage limitations: a flag indicating yes or no.
  Data can be re-licensed as a whole: a flag indicated yes or no.
  Data can be re-licensed in parts: a flag indicating yes or no; if yes, a scope matrix must be created.
  Data can be re-sold as a whole: a flag indicated yes or no.
  Data can be re-sold in parts: a flag indicated yes or no; if yes, a scope matrix must be created.
  Data must be licensed by user.
  Total number of users licensed.
  Data license start time.
  Data license end time.
  License cost acquisition—entire set: cost for the entire set.
  License cost per record group acquisition: cost for a record group.
  License cost re-sell—entire set: cost for the entire set.
  License cost per record group re-sell: cost for a record group.

Record number in record group: number of records in the group.

Scope matrix.

The scope matrix defines the scope of the data license for one or more of the attributes in the information asset, when the data can be licensed or sold in parts, i.e., by attribute. One possible embodiment of the scope matrix is shown below, wherein the information asset attributes comprise the rows, the data license attributes comprise the columns, and the intersection of each row and column comprises the scope of the data license applied to the information asset attribute:

| Scope Matrix | Re-license in Parts | Re-sold in Parts |
|---|---|---|
| Attribute 1 | N | N |
| Attribute 2 | Y | Y |
| Attribute 3 | N | N |
| Attribute 4 | N | N |
| ... | ... | ... |

With these data license attributes, and during the registration of the information asset into the catalog, the data license is associated with the information asset in the Catalog 106 as well.

FIG. 3 illustrates how a data license is bound to an information asset according to one embodiment. In this example, the information asset 300 is a bank checking table, comprised of the following attributes: balance 302, branch 304, holder id 306, account id 308, etc. The data license 310 is comprised of the data license attributes set forth above, such as data license id 312, data license owner 312, must credit owner 314, etc. The data license 310 includes a scope matrix 316 showing the re-license in parts 318 and re-sell in parts 320 attributes of the data license 310 corresponding to various attributes of the bank checking table 300, including balance 302, branch 304, holder id 306, account id 308, etc.

Figure 4:
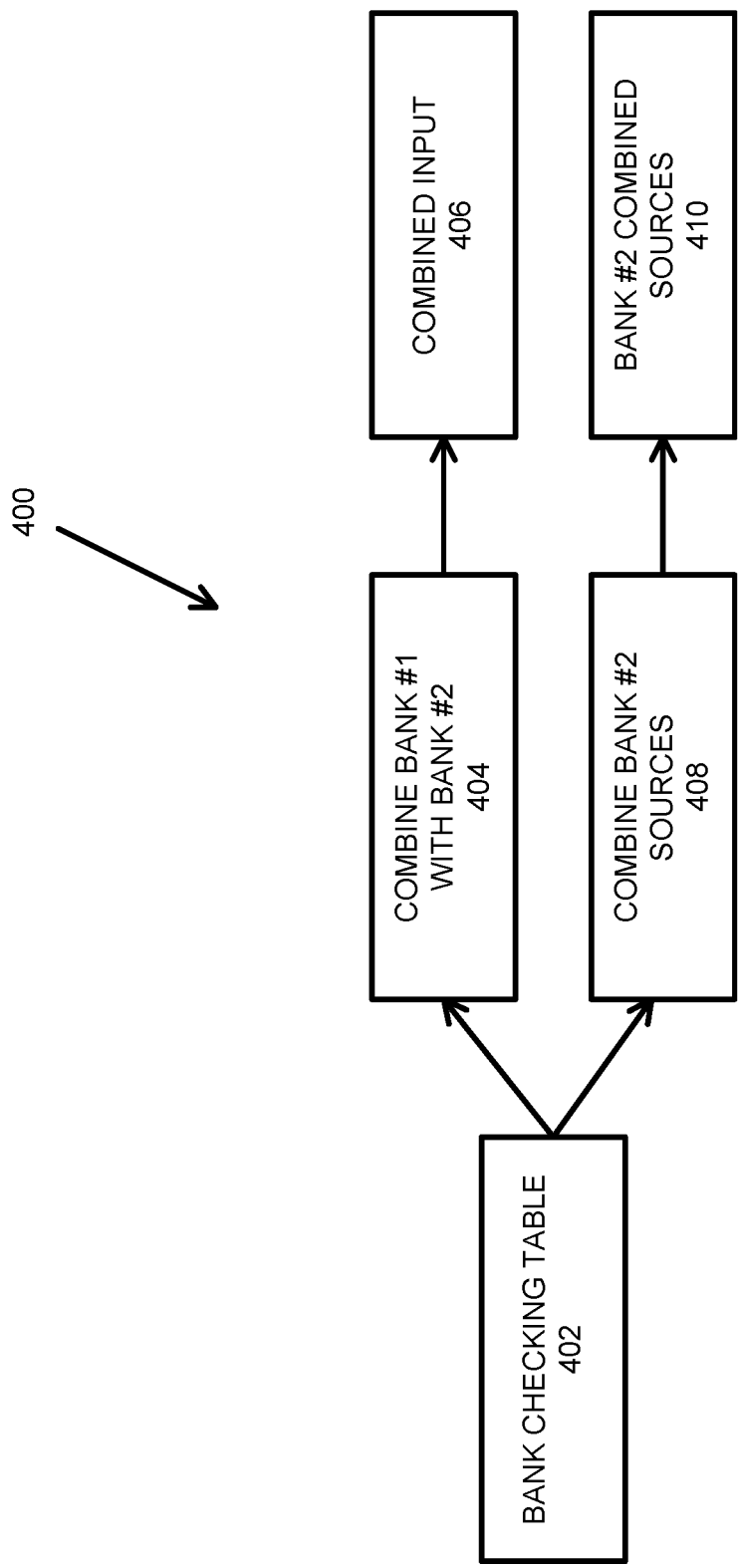
FIG. 4 illustrates how a lineage graph of data licenses are created for information assets.

FIG. 4 illustrates how a lineage graph 400 of data licenses is created for information assets by the Data License Manager 108. In this example, the information asset known as Bank Checking Table 402 is input to a function known as Combine Bank #1 With Bank #2 404 that results in the creation of another information asset known as Combined Input 406, and the information asset known as Bank Checking Table 402 is input to a function known as Combine Bank #2 Sources 408 that results in the creation of another information asset known as Bank #2 Combined Sources 410. (The lineage graph 400 may use colors, shapes or other means to distinguish between information assets and functions.) By displaying this lineage graph 400, it is easy to follow where the information assets are used and hence which new or derived information assets need to adhere to the boundaries of the data licenses.

For example, if a data license is bound to an information asset, either on the information asset as a whole or on individual attributes of the information asset, they can be traced through the lineage graph 400 to determine if there is a need for a derived license for derived information assets. The lineage graph 400 can also be used to determine if the information asset bound by a data license has been only used for lookup or validation operations, and hence no new information asset has been created requiring a new data license.

In terms of the computing the data license of derived information assets, the Data License Manager 108 applies the concept of "more restrictive succeeds".

Usage limitations: if Company Asset #1=NO and Company Asset #2=YES, then Derived New Asset #3=YES.

Re-license in Whole: If Company Asset #1=YES and Company Asset #2=NO, then Derived New Asset #3=NO.

The Data License Manager 108 also calculates the cumulative license cost for re-selling an information asset:

Cost of license to Company Asset #1=$1,000.00.
Cost of license to Company Asset #2=$500.00.
Cost of license to Derived New Asset #3=$1,500.00.

The rules can be also applied on the Scope Matrix level, if needed, for a more fine-granular consideration. The data license for the derived information asset can be shown in the user interface of the Data License Manager 108 and edited there if necessary by the Governance Team 116 or Information Curator 118.

The Data License Controller 110 enforces key aspects of the data license in terms of compliance. If a data license has a maximum number of users, then the Data License Controller 110 keeps track of how many users are working with the information asset. If a new user wants to access an information asset with a maximum user bound and all "seats" are taken, then the Data License Controller 110 prevents the new user from accessing that information asset until a seat is returned.

If a data license (usually in SaaS models) is acquired, then the data license represents a subscription for a certain time. Once that time period expires, depending on the license type, the user does not get updates anymore and/or the user needs to delete the acquired data and is no longer permitted to use the information asset. In this case, the Data License Controller 110 provides the following functionality:

Configurable alerts (possible more than one with increasing urgency) to the users of the information asset that the data license expires soon.

Once the data license has expired, the Data License Controller 110 updates the Data License Manager 108 to remove access right of the user(s) 120 to the information asset in question. Once this is done, the information asset cannot be accessed by those users 120, and the information asset can only be accessed by other user(s), such as the Information Governance Team 116, with sufficient access rights to the Catalog 106.

If a data license has expired, and depending on the configuration of the Data License Controller 110 by the Governance Team 116, the information asset may be inactive, but still stored if that storage is compatible with the data license, until such time as the data license is renewed or the information asset is deleted.

To implement the functionality of the Data License Controller 110, the attributes of the data license description language should also include:

Start/end time.
Minimum/maximum number of users.

Furthermore, the Catalog 106 provides the binding of the data license to the data sources that are the physical storage for the Repository 104 of the information assets to which the data license applies. This provides critical information such as user id, password, data source name, IP address, ports, etc., to connect to that Repository 104. Similar to database access monitoring, the Data License Controller 110 can then prevent access to an information asset if such access is attempted by a user who lacks a proper data license.

Flowchart

Figure 5:
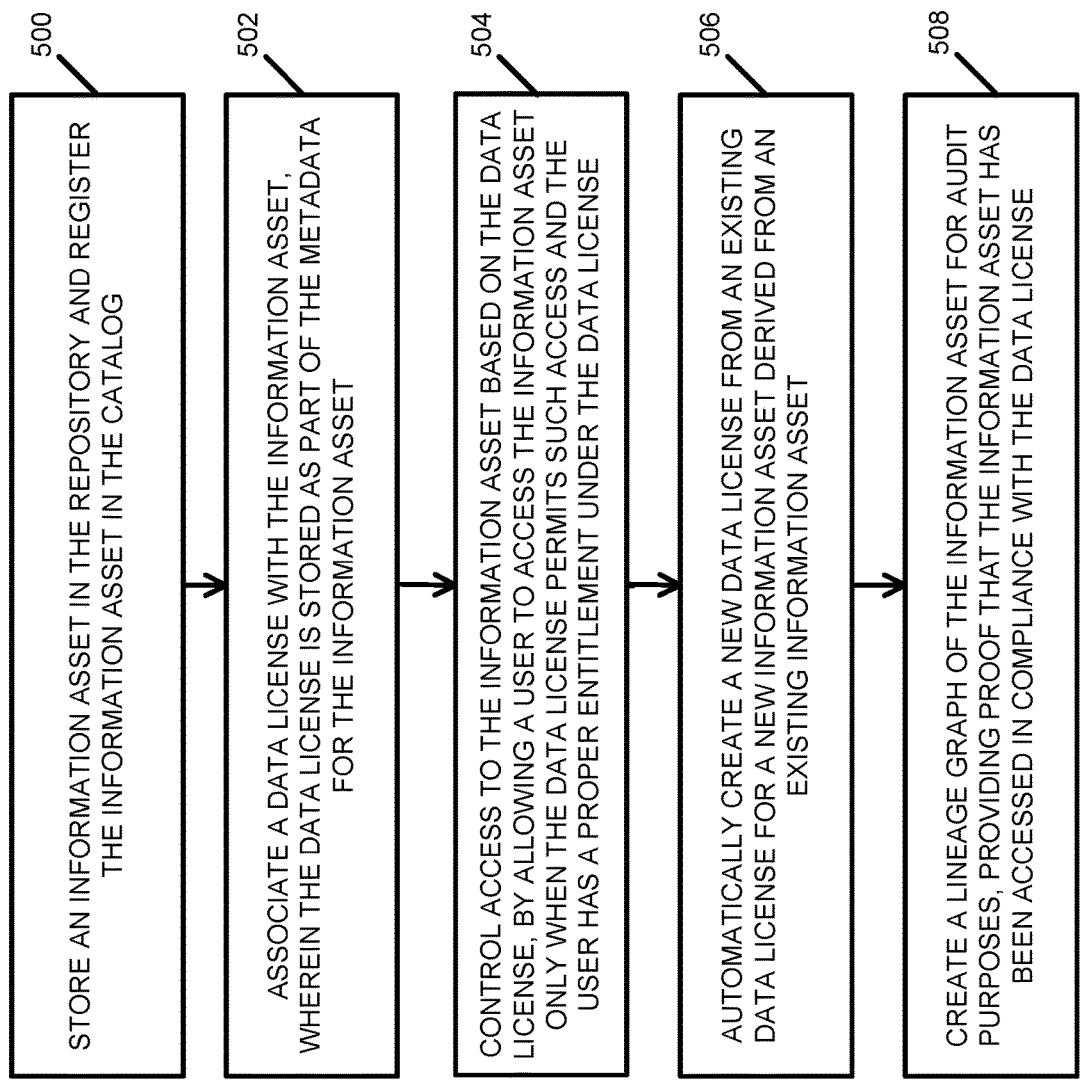
FIG. 5 is a flowchart illustrating the steps performed by the cognitive software upgrade analysis system when implementing the computer-implemented method of this invention.

FIG. 5 is a flowchart illustrating the steps performed by the system 100 when implementing the computer-implemented method of this invention, according to one embodiment.

Block 500 represents the system 100 storing an information asset in the Repository 104. This Block also represents the system 100 registering the information asset in the Catalog 106 for the Repository 104.

Block 502 represents the system 100 associating a data license with the information asset in the Catalog 106, wherein the data license is stored as part of the information asset's metadata in the Catalog 106.

Block 504 represents the system 100 controlling access to the information asset stored in the Repository 104 based on the data license, by allowing a user to access the information asset only when the data license permits such access and the user has a proper entitlement under the data license to access the information asset. In addition, this Block represents the system 100 generating an alert if the user tries to access the information asset for which the user does not have the proper entitlement under the data license; allowing the user to add the proper entitlement to their account if needed; and preventing additional checkouts of the information asset once a maximum number of users permitted for the information asset under the data license is reached, until at least one of the users returns the information asset or additional license coverage becomes available.

Block 506 represents the system 100 automatically creating a new data license for a new information asset derived from an existing information asset, wherein the new data license is derived from an existing data license.

Block 508 represents the system 100 automatically creating a lineage graph of the information asset for audit purposes, providing proof that the information asset has been accessed in compliance with the data license. The lineage graph may be used by the system 100 to determine whether there is a need for a new data license derived from the existing data license for a new information asset derived from the existing information asset. In this regard, the lineage graph may be used to determine whether the information asset bound by the data license has been only used for lookup or validation operations, and hence no new information asset has been created from the information asset requiring a new data license.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
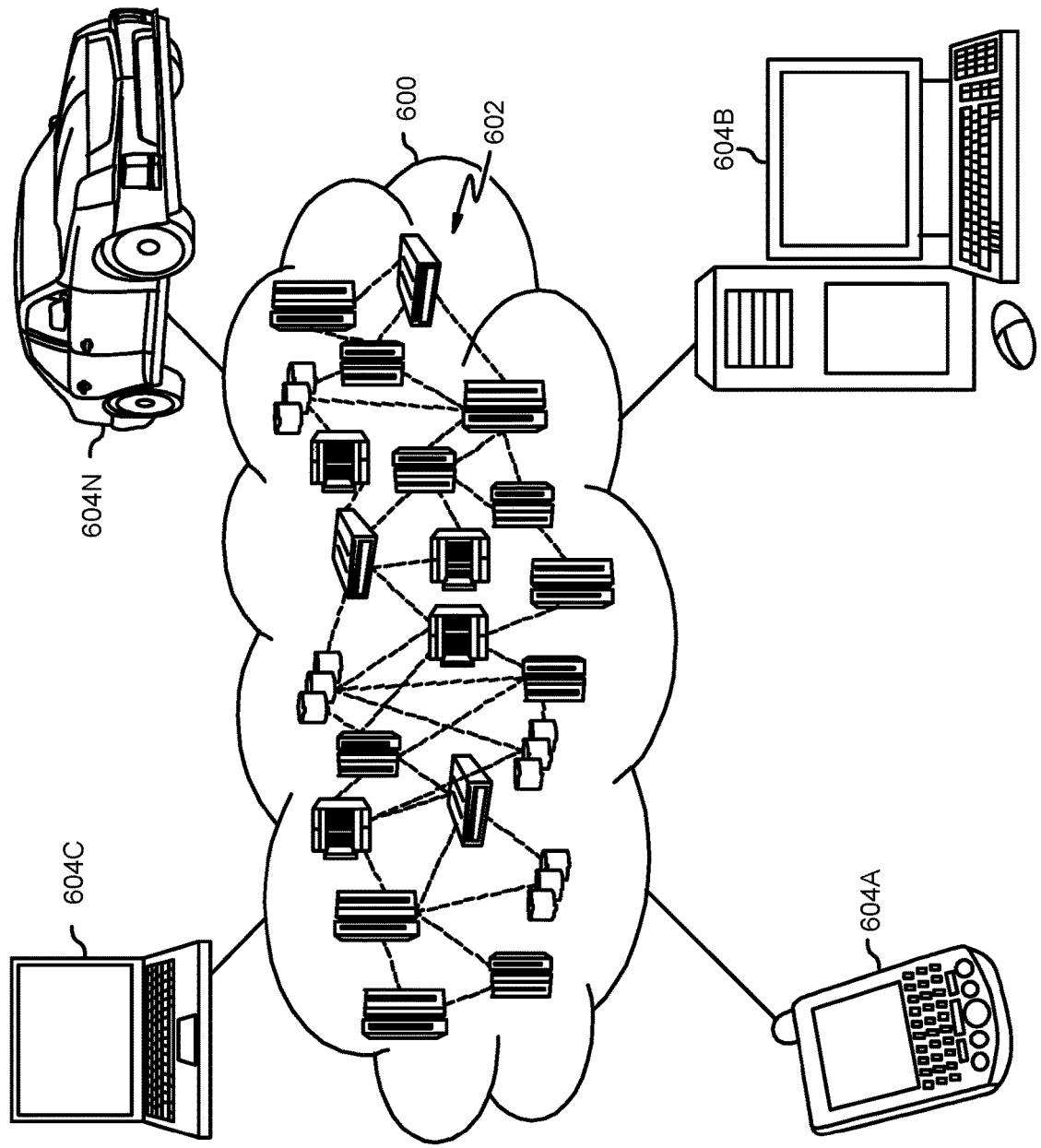
FIG. 6 depicts a cloud computing environment according to an embodiment of the present invention.

Referring now to FIG. 6, illustrative cloud computing environment 600 is depicted. As shown, cloud computing environment 600 includes one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
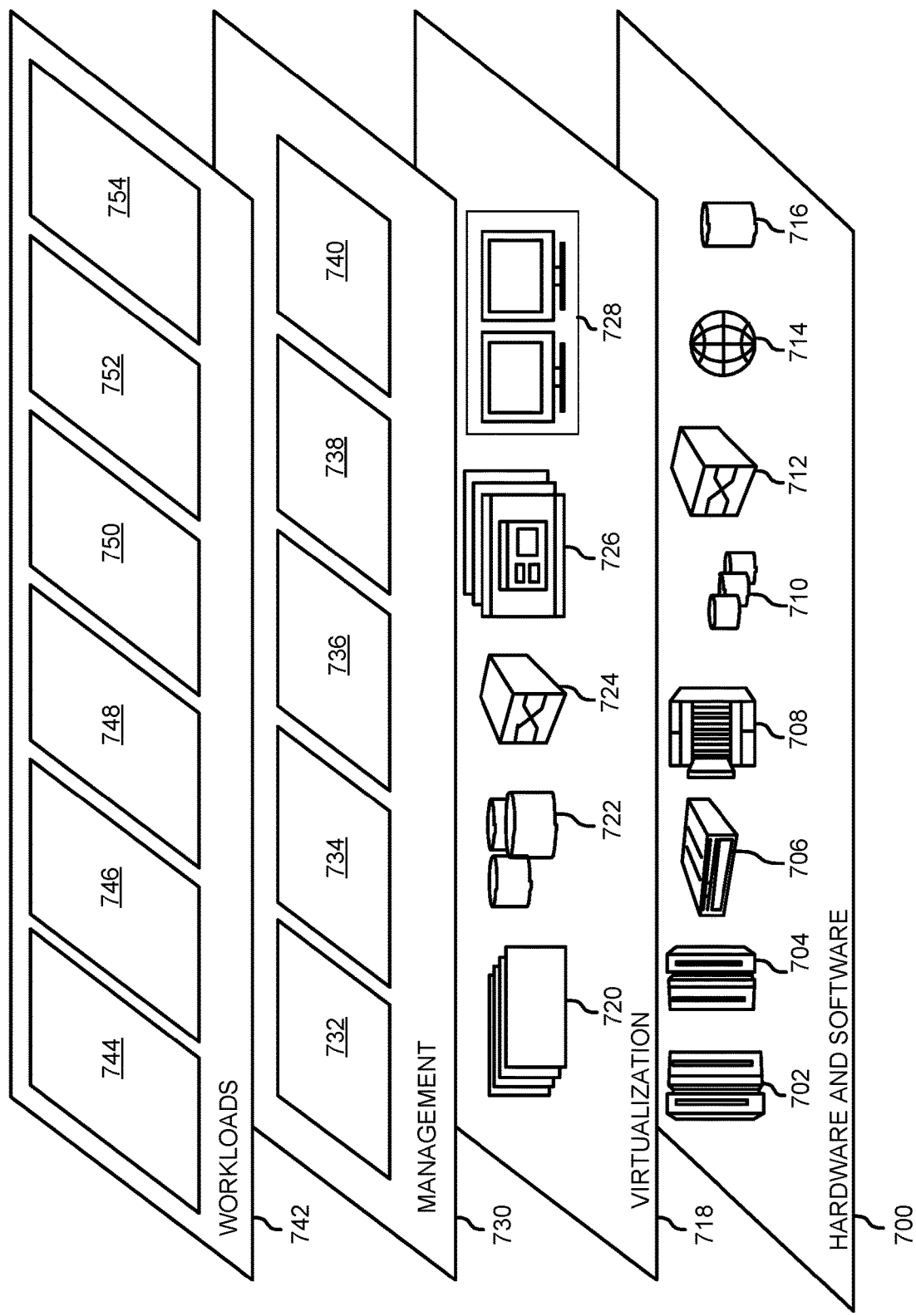
FIG. 7 depicts abstraction model layers according to an embodiment of the present invention.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 700 includes hardware and software components. Examples of hardware components include: mainframes 702; RISC (Reduced Instruction Set Computer) architecture based servers 704; servers 706; blade servers 708; storage devices 710; and networks and networking components 712. In some embodiments, software components include network application server software 714 and database software 716.

Virtualization layer 718 provides an abstraction layer from which the following examples of virtual entities may be provided: virtual servers 720; virtual storage 722; virtual networks 724, including virtual private networks; virtual applications and operating systems 726; and virtual clients 728.

In one example, management layer 730 may provide the functions described above. Resource provisioning 732 provides dynamic procurement of computing resources and other resources that are utilized to perform tasks within the cloud computing environment 600. Metering and pricing 734 provide cost tracking as resources are utilized within the cloud computing environment 600, and billing or invoicing for consumption of these resources. In one example, these resources may include information assets subject to data licenses as described above. Security provides identity verification for cloud consumers and tasks, as well as protection for data and other resources. User portal 736 provides access to the cloud computing environment 600 for consumers and system administrators. Service level management 738, which includes containers, provides cloud computing resource allocation and management such that required service levels are met. Service Level Agreement (SLA) planning and fulfillment 740 provide pre-arrangement for, and procurement of, cloud computing resources for which a future requirement is anticipated in accordance with an SLA.

Workloads layer 742 provides examples of functionality for which the cloud computing environment 600 may be utilized. Examples of workloads, tasks and functions which may be provided from this layer include: mapping and navigation 744; software development and lifecycle management 746; virtual classroom education delivery 748; data analytics processing 750; transaction processing 752; and the processing 754 of information assets and their associated data licenses as described herein.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

CONCLUSION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
storing an information asset in a repository implemented by one or more computers, wherein the stored information asset includes a plurality of asset attributes;
registering the information asset in a catalog for the repository implemented by the one or more computers;
associating a data license with the information asset in the catalog, wherein the data license is stored as part of the information asset's metadata in the catalog, wherein the data license includes a scope matrix indicating a license scope for each asset attribute within the plurality of asset attributes, and wherein the scope matrix further indicates if each asset attribute of the information asset can be re-licensed in parts and if each asset attribute of the information asset can be re-sold in parts;
controlling access to the information asset stored in the repository based on the data license, by allowing a user to access the information asset only when the data license permits such access and the user has a proper entitlement under the data license to access the information asset; and
preventing additional checkouts of the information asset once a maximum number of users permitted for the information asset under the data license is reached, until at least one of the users returns the information asset or the maximum number of users permitted is increased.

2. The method of claim 1, further comprising allowing the user to add the proper entitlement to their account if needed.

3. The method of claim 1, further comprising generating an alert if the user tries to access the information asset for which the user does not have the proper entitlement under the data license.

4. The method of claim 1, wherein the information asset comprises an existing information asset, the data license comprises an existing data license, and the method further comprises automatically creating a new data license for a new information asset derived from the existing information asset, wherein the new data license is derived from the existing data license.

5. The method of claim 1, further comprising automatically creating a lineage graph of the information asset for audit purposes, providing proof that the information asset has been accessed in compliance with the data license.

6. The method of claim 5, wherein the information asset comprises an existing information asset, the data license comprises an existing data license, and the lineage graph is used to determine whether there is a need for a new data license derived from the existing data license for a new information asset derived from the existing information asset.

7. The method of claim 5, wherein the lineage graph is used to determine whether the information asset bound by the data license has been only used for lookup or validation operations, and hence no new information asset has been created from the information asset requiring a new data license.

8. A computer-implemented system, comprising:
one or more computers programmed for:
storing an information asset in a repository implemented by one or more computers, wherein the stored information asset includes a plurality of asset attributes;
registering the information asset in a catalog for the repository implemented by the one or more computers;
associating a data license with the information asset in the catalog, wherein the data license is stored as part of the information asset's metadata in the catalog, wherein the data license includes a scope matrix indicating a license scope for each asset attribute within the plurality of asset attributes, and wherein the scope matrix further indicates if each asset attribute of the information asset can be re-licensed in parts and if each asset attribute of the information asset can be re-sold in parts;
controlling access to the information asset stored in the repository based on the data license, by allowing a user to access the information asset only when the data license permits such access and the user has a proper entitlement under the data license to access the information asset; and
preventing additional checkouts of the information asset once a maximum number of users permitted for the information asset under the data license is reached, until at least one of the users returns the information asset or the maximum number of users permitted is increased.

9. The system of claim 8, further comprising allowing the user to add the proper entitlement to their account if needed.

10. The system of claim 8, further comprising generating an alert if the user tries to access the information asset for which the user does not have the proper entitlement under the data license.

11. The system of claim 8, wherein the information asset comprises an existing information asset, the data license comprises an existing data license, and the system further comprises automatically creating a new data license for a new information asset derived from the existing information asset, wherein the new data license is derived from the existing data license.

12. The system of claim 8, further comprising automatically creating a lineage graph of the information asset for audit purposes, providing proof that the information asset has been accessed in compliance with the data license.

13. The system of claim 12, wherein the information asset comprises an existing information asset, the data license comprises an existing data license, and the lineage graph is used to determine whether there is a need for a new data license derived from the existing data license for a new information asset derived from the existing information asset.

14. The system of claim 12, wherein the lineage graph is used to determine whether the information asset bound by the data license has been only used for lookup or validation operations, and hence no new information asset has been created from the information asset requiring a new data license.

15. A computer program product, the computer program product comprising a computer readable storage medium having program instructions embodied therewith, the program instructions executable by a processor to cause the processor to:
storing an information asset in a repository implemented by one or more computers, wherein the stored information asset includes a plurality of asset attributes;
registering the information asset in a catalog for the repository implemented by the one or more computers;
associating a data license with the information asset in the catalog, wherein the data license is stored as part of the information asset's metadata in the catalog, wherein the data license includes a scope matrix indicating a license scope for each asset attribute within the plurality of asset attributes, and wherein the scope matrix further indicates if each asset attribute of the information asset can be re-licensed in parts and if each asset attribute of the information asset can be re-sold in parts;
controlling access to the information asset stored in the repository based on the data license, by allowing a user to access the information asset only when the data license permits such access and the user has a proper entitlement under the data license to access the information asset; and
preventing additional checkouts of the information asset once a maximum number of users permitted for the information asset under the data license is reached, until at least one of the users returns the information asset or the maximum number of users permitted is increased.

16. The computer program product of claim 15, wherein the information asset comprises an existing information asset, the data license comprises an existing data license, and the method further comprises automatically creating a new data license for a new information asset derived from the existing information asset, wherein the new data license is derived from the existing data license.

17. The computer program product of claim 15, further comprising automatically creating a lineage graph of the information asset for audit purposes, providing proof that the information asset has been accessed in compliance with the data license.

18. The computer program product of claim 17, wherein the information asset comprises an existing information asset, the data license comprises an existing data license, and the lineage graph is used to determine whether there is a need for a new data license derived from the existing data license for a new information asset derived from the existing information asset.

* * * * *